United States Patent [19]

Colegrove

[11] Patent Number: 4,792,415

[45] Date of Patent: Dec. 20, 1988

[54] QUATERNARY AMMONIUM SALTS OF ANIONIC GUMS

[75] Inventor: George T. Colegrove, San Diego, Calif.

[73] Assignee: Merck & Co., Inc., Rahway, N.J.

[21] Appl. No.: 37,656

[22] Filed: Apr. 13, 1987

[51] Int. Cl.$^4$ ................................. C09K 3/00
[52] U.S. Cl. ........................ 252/308; 252/315.3; 252/8.554; 106/13; 435/104; 536/114
[58] Field of Search ............ 106/13; 252/70, DIG. 8, 252/8.554, 308, 315.3; 514/54; 435/104; 536/114

[56] References Cited

U.S. PATENT DOCUMENTS

| | | |
|---|---|---|
| Re. 23,528 | 7/1952 | Gaver et al. |
| 2,931,753 | 4/1960 | Chesbro et al. ............... 514/54 X |
| 3,119,812 | 1/1964 | Rogovin et al. ............... 435/104 X |
| 3,147,224 | 9/1964 | Gauntt et al. ............... 252/DIG. 8 |
| 3,163,602 | 12/1964 | Lindblom et al. |
| 3,352,709 | 11/1967 | Gunnar et al. ............... 106/13 X |
| 3,598,730 | 8/1971 | Nordgren et al. ............... 536/114 X |
| 3,650,969 | 3/1972 | Baltakmens et al. ............... 252/DIG. 8 |
| 3,696,035 | 10/1972 | Nimerick ............... 252/8.551 |
| 3,928,316 | 12/1975 | Jordan et al. |
| 3,937,283 | 2/1976 | Blauer et al. ............... 252/8.551 X |
| 4,018,729 | 4/1977 | Faucher et al. |
| 4,201,552 | 5/1980 | Rowell et al. |
| 4,233,438 | 11/1980 | Myers et al. ............... 252/8.551 X |
| 4,242,098 | 12/1980 | Braun et al. |
| 4,342,866 | 8/1982 | Kang et al. ............... 536/114 X |
| 4,426,409 | 1/1984 | Roe ............... 106/13 X |
| 4,502,891 | 3/1985 | Brocklehurst et al. ............... 252/DIG. 8 |
| 4,529,797 | 7/1985 | Peik et al. ............... 435/104 |
| 4,591,639 | 5/1986 | Fischer et al. ............... 536/114 |
| 4,643,840 | 2/1987 | Brocklehurst et al. ............... 252/DIG. 8 |
| 4,683,080 | 7/1987 | Rei et al. ............... 252/308 X |
| 4,689,160 | 8/1987 | Steenbergen et al. ............... 252/315.3 X |
| 4,717,488 | 1/1988 | Seheult et al. ............... 252/315.1 X |

FOREIGN PATENT DOCUMENTS

| | | | |
|---|---|---|---|
| 79794 | 5/1983 | European Pat. Off. ......... | 252/8.554 |
| 48291 | 4/1980 | Japan ................... | 252/308 |
| 47493 | 4/1981 | Japan ................... | 252/308 |
| 944738 | 12/1963 | United Kingdom ................ | 252/309 |

OTHER PUBLICATIONS

Crema et al., *Soc. of Pet. Eng.*, No. 13565, 159–161 (1985) presented at International Symposium on Oilfield and Geothermal Chemistry, Phoenix AZ (Apr. 9–11, 1985).

*Primary Examiner*—Matthew A. Thexton
*Attorney, Agent, or Firm*—Gabriel Lopez; Hesna J. Pfeiffer

[57] ABSTRACT

Derivatized anionic gums and compositions thereof are disclosed. The gum derivatives are prepared by reacting non-derivatized gum with quaternary ammonium compounds in an amount equal to or greater than the stoichiometric amount required for complete derivatization. The derived gums are soluble in organic solvents.

7 Claims, No Drawings

QUATERNARY AMMONIUM SALTS OF ANIONIC GUMS

BACKGROUND OF THE INVENTION

U.S. Pat. No. 3,163,602 teaches fully derivatized xanthan gum prepared by reacting xanthan gum aqueous solutions (either fermentation broth or solutions from dry powder) with an excess amount of quaternary ammonium compounds. The derivatized gum is insoluble in distilled water but soluble in brine.

SUMMARY OF THE INVENTION

Derivatized anionic gums have now been found which are produced by reacting an anionic gum with a quaternary ammonium compound in an amount equal to or in excess of the stoichiometric amount necessary for complete derivatization of the gum. The derivatized gums are soluble in organic solvents.

An embodiment of this invention is quaternarized S-194 and quaternarized S-130.

Another embodiment is thickened compositions comprising a quaternarized anionic gum salt, an organic solvent, and, optionally, water.

DETAILED DESCRIPTION

The anionic gums useful for preparing the derivatized quaternary ammonium salts of this invention are xanthan, S-194, and S-130.

By the term "xanthan gum", as used herein, is meant the extracellularly produced gum made by the heteropolysaccharide-producing bacterium *Xanthomonas campestris* by the whole culture fermentation under a variety of conditions of a medium comprising: a fermentable carbohydrate, a nitrogen source, and other appropriate nutrients. Examples, inter alia, of commercially available xanthan gums are KELTROL® and KELZAN®, available from Kelco Division of Merck & Co., Inc.

Processes for producing xanthan gum are well-known in the art, e.g., U.S. Pat. Nos. 4,316,012; 4,352,882; 4,375,512; 3,671,398; 3,433,708; 3,271,267; 3,594,280; 3,591,578; 3,391,061; 3,020,206; 3,481,889; 3,391,060; and UK Pat. No. 1,448,645.

By the term "S-194": (also known as rhamsan gum) is meant the extracellularly produced gum made by the heteropolysaccharide-producing bacterium of the genus Alcaligenes, ATCC 31961, by the whole culture fermentation under a variety of conditions of a medium comprising: a fermentable carbohydrate, a nitrogen source, and other appropriate nutrients. Processes for producing S-194 are described in U.S. Pat. No. 4,401,760 and EP No. 192,332 (Aug. 27, 1986), both of which are incorporated herein by reference.

By the term "S-130" (also known as welan gum) is meant the extracellularly produced gum made by the heteropolysaccharide-producing bacterium of the genus Alcaligenes, ATCC 31555, by the whole culture fermentation under a variety of conditions of a medium comprising: a fermentable carbohydrate, a nitrogen source, and other appropriate nutrients. Processes for producing S-130 are described in U.S. Pat. No. 4,342,866, which is incorporated herein by reference.

The quaternary ammonium compounds (quats) useful in this invention are those having a single alkyl or alkenyl substituent containing from about 13 to 24 carbon atoms, or two alkyl or alkenyl substituents of 12 to 24 carbons per substituent and the ethylene oxide substituted analogs thereof. These are known compounds. An especially useful quat is alkyl dimethylbenzylammonium chloride.

The derivatized anionic gum salts of this invention are readily formed by intimately mixing the non-derivatized anionic gums and the quats, preferably in an aqueous solution, slurry, or suspension. Generally, this is done under mild conditions such as room temperature and neutral pH. However, temperatures can range from about 10° to 90° C. and pH 2-8. The gum solution may be the fermentation broth in which the gum was produced. However, the reaction is preferably run using recovered gum in deionized water. The quat may be dissolved in either water or an alkanol/water blend. Normally, the amount of quat is in excess (up to about 3×) the stoichiometric amount required. Although tap water may be used it is preferable that there be no added soluble salts as such salts tend to screen anionic functional groups and thus tend to prevent the gum/quat reaction. Following precipitation of the fibrous gum salts, they can be washed in hot water, dried and milled.

The salts of this invention are useful for viscosifying organic solvents, especially lower ($C_1$-$C_3$) alkanols, both straight and branched chain. These include methanol, ethanol, propanol, and isopropanol (IPA). Other useful solvents are N-methyl-2-pyrrolidone, ethylene glycol, and propylene glycol. Other than methanol, the alkanol solvents require 10-20% water (wt/wt) as co-solvent. In addition to the alkanols, these thickened compositions may also contain methylene chloride.

Generally, the compositions of this invention comprise 0.05-5.0% (wt/wt) (preferably 0.1 to 2%) derivatized gum and solvent, said solvent being N-methyl-2-pyrrolidone, $C_1$-$C_3$ alkanol, 9:1 to 8:2 $C_1$-$C_3$ alkanol:water, ethylene glycol, or propylene glycol. When the first solvent is methanol or methanol:water, the compositions may also comprise methylene chloride in amounts up of 60-80%, based on total weight of the composition.

Depending on the particular end use of these compositions, they may also contain additional ingredients. For example, compositions of this invention, when they comprise N-methyl-2-pyrrolidone or methylene chloride, are particularly useful as paint strippers. These paint stripping compositions may optionally contain paraffin wax to retard solvent evaporation, activators such as amines, and cationic or anionic surfactants to promote removal by water. Such additives are well known to formulators of paint stripping compositions.

The solvent N-methyl-2-pyrrolidone (NMP) can be used as a replacement for methylene chloride in paint strippers. The solvent can be used as is or blended with water and is effective in removing dried paint films. It was discovered that many of the derivatized anionic gum salts of this invention are soluble in NMP or NMP/water blends and provide high viscosity particularly at low shear rates, which permits the stripper to cling to vertical surfaces but does not interfere with its effectiveness.

The derivatized gums may also be used in alkanol based foams. Crema et al., Soc. of Pet. Eng. No. 13565, 159–161 (1985) discuss the foaming of anhydrous methanol for well stimulation. Such foams contain nonionic- and fluoro-surfactants as foaming agents and may contain stabilizers to increase half-life provided they do not detract from foam quality, which is basically a percentage increase in volume due to foaming.

Other compositions include alkanol based coal slurries for stable fuel or for transport of coal, cosmetic films, thickened fuels (e.g., charcoal starters, Sterno-type fuels, etc.) de-icing fluids, alcohol-based printing inks, ceramic binders, and similar systems where it is desirable to viscosify or suspend organic solvent-based systems.

Since these quaternary ammonium salts retain the high viscosity and pseudoplastic rheology of the native, i.e. non-derivatized, gums, they advantageously permit the application of organic solvents to, for example, vertical surfaces without excessive sagging or run-off and provide suspension stability over time.

Furthermore, the shear-thinning characteristics of these salts permit easy pumping of these compositions. In de-icing compositions for application to aircraft, this combination of properties is very advantageous.

Other embodiment of this invention is a composition useful for preparing flexible bactericidal films. Such films may be cast directly from compositions comprising 0.1–2% quaternary ammonium salt and propylene glycol or $C_2$–$C_3$ alkanol/water solutions wherein the ratio alkanol:water is approximately 1.5:1. Where extra mildness is desired a quat with a law primary irritation index (such as Monaquat P-TC) may be used.

The invention is further defined by reference to the following examples, which are intended to be illustrative and not limiting.

Temperatures are in degrees Celsius.

Chemically, the quats used in the following examples are as follows:
(1) Ethoquad 18/12—methylbis(2-hydroxyethyl)octadecyl NH$_4$Cl, 70% active;
(2) Arquad 2C-75—dicocodimethyl ammonium chloride, 75% active;
(3) Arquad 12-50—dodecyltrimethyl NH$_4$Cl, 50% active;
(4) Arquad 16-50—hexadecyltrimethyl NH$_4$Cl, 50% active;
(5) Arquad 18-50—octadecyltrimethyl ammonium chloride, 50% active;
(6) Arquad 2HT-75—dimethyldi(hydrogenated tallow) NH$_4$Cl, 75% active;
(7) Barquat MS-100—stearyldimethyl benzyl NH$_4$Cl, 100% active,
(8) Ethoquad 18/25—methylpolyoxyethylene (15) octadecyl NH$_4$Cl, 95% active;
(9) Jordaquat 522—Isostearylamido propyldimethylethyl ammonium ethosulfate, 85% active;
(10) Jordaquat 1033—soyadimethylethyl ammonium ethosulfate, 54% active; and
(11) Adogen 442—Di(hydrogenated tallow) dimethyl NH$_4$Cl, 75% active.
(12) Monaquat P-TC—tri(cocamidopropyldimethylpropylene glycol ammonium chloride)phosphate.

EXAMPLE 1

DERIVATIZED ANIONIC GUMS 60 ml of a 1.5% (wt.) gum solution in deionized water was reacted at 25° C. by mixing with a mechanical stirrer for up to ½ hour with twice the stoichiometric amount of the following quats:

| | |
|---|---|
| (1) Arquad 12/50 | (6) Ethoquad 18/12 |
| (2) Arquad 18/50 | (7) Barquat MS-100 |
| (3) Arquad 16/50 | (8) Jordaquat 522 |
| (4) Arquad 2C-75 | (9) Jordaquat 1033 |

(5) Ethoquad 18/25

The fibrous precipitates were washed with hot water, dried, and milled through 80 mesh (U.S. Standard). All the derivatives were soluble in methanol. Solubility in ethanol or isopropanol required the addition of 10–20% water (wt/wt) as co-solvent.

The viscosities of the salts in ethanol are usually less than obtained with the non-derivatized gum in water; however the pseudoplastic or shear thinning behavior is retained and the low shear rate viscosities remain high for good suspending ability. The following viscosities were obtained on 1.0% (wt.) solutions in methanol (after 3 hours of mixing) using a Brookfield LVT viscometer, spindle #2, 25° C.

| Gum | Quat | 60 rpm Visc. (cP) | 6 rpm Visc. (cP) |
|---|---|---|---|
| (1) Xanthan | Arquad 18-50 | 530 | 2300 |
| (2) Xanthan | Jordaquat 1033 | 290 | 800 |
| (3) Xanthan | Jordaquat 522 | 305 | 1300 |
| (4) Rhamsan | Arquad 16-50 | 410 | 3000 |
| (5) Rhamsan | Jordaquat 1033 | 510 | 4100 |
| (6) Rhamsan | Barquat MS-100 | 600 | 4500 |

EXAMPLE 2

METHYLENE CHLORIDE COMPOSITIONS

The derivatives of Example 1 are not soluble in neat methylene chloride but are soluble when about 20% methanol is present to solvate the polymer. (The derivative may be dissolved in methanol first then added to methylene chloride or, depending on the quat, may be dissolved directly in a methylene chloride/methanol blend.) The following derivatives dissolved directly in a methylene chloride/methanol 80/20 (w/w) blend at ambient temperature to produce viscous solutions.

| Gum | Quat | 60 rpm Visc. (cP) | 6 rpm Visc. (cP) |
|---|---|---|---|
| (1) Xanthan | Arquad 16-50 | 1200 | 6500 |
| (2) Xanthan | Arquad 2HT-75 | 1550 | 7500 |
| (3) Rhamsan | Ethoquad 18/25 | 600 | 4000 |

PAINT STRIPPER

| Ingredient | % by Weight |
|---|---|
| Paraffin wax | 1.5 |
| Tripropyl amine | 1.5 |
| Xanthan gum/Arquad 18-50 | 1.0 |
| Methylene chloride | 76.8 |
| Methanol | 19.2 |

All liquids were blended, the wax was added, followed by the xanthan gum/quat derivative. The composition was placed in a closed Osterizer blender and sheared at medium speed while warming to dissolve the wax. The product was viscous, 1070 cP (Brookfield LVT viscometer, spindle #3 at 60 rpm) and stable for six months at ambient temperature with no liquid separation. When applied to painted surface, both wood and metal, the paint was lifted by the solvent and could be scraped off easily.

EXAMPLE 3

FOAMS

Using the procedure for making foams recommended by Crema et al., supra, 200 ml methanol containing 0.5% FC-742 (flurocarbon surfactant, 3M) and 2% Pluradyne SF-1042 (BASF) were placed in a Hobart mixer and mixed five minutes at 300 rpm with a wire whip. The foam quality and half-life (time to break foam to 100 ml of free liquid) were measured. The xanthan gum and rhamsan gum derivatives were first dissolved in the methanol followed by the surfactants. The following data were obtained:

| Stabilizer | Foam Quality | Half-Life | Viscosity* |
|---|---|---|---|
| (1) Control | 81.5 | 2.75 min | 3.0 cP |
| (2) Xanthan gum/ Arquad 16-50 deriv. (0.05%) | 76.7 | 8.75 min | 6.4 cP |
| (3) Rhamsan gum Jordaquat 1033 (0.05%) | 69.0 | 6.25 min | 6.8 cP |

*Brookfield LVT viscometer, spindle #1, 60 rpm.

The quat derivatives increased the half-life by increasing the viscosity without seriously affecting the foam quality, and thus are useful for stabilizing alkanol foams.

EXAMPLE 4

N-METHYL-2-PYRROLIDONE COMPOSITIONS

Following a procedure such as in Example 1, quaternary ammonium salts of xanthan, rhamsan, and welan gums were prepared and NMP compositions containing 1% salt and 99% NMP were prepared by dissolving the salt derivatives directly in the NMP. Viscosities of these compositions were measured on a Brookfield LVT viscometer, spindle #3 and the following data obtained:

| Gum | Quat | 60 rpm Visc. (cP) | 6 rpm Visc. (cP) |
|---|---|---|---|
| Xanthan | Arquad 12-50 | 1500 | 3700 |
| Xanthan | Adogen 442 | 416 | 2500 |
| Xanthan | Barquat MS-100 | 310 | 610 |
| Xanthan | Arquad 2C-75 | 440 | 1000 |
| Rhamsan (S-194) | Adogen 442 | 410 | 2500 |
| Welan (S-130) | Arquad MS-100 | 670 | 1200 |

EXAMPLE 5

BACTERICIDAL FILMS

The gum derivatives of this invention form flexible films when cast from alcohol solutions. Such films are valuable as a slow release form of the quat to provide bactericidal activity. Alcohol/water blends containing greater than 50% isopropanol have been used as a disinfectant hand wash in hospitals. The derivatives of this invention are soluble directly in 60% isopropanol/40% water (1.5:1) solutions and provide a lotion type feel on the skin.

Xanthan gum precipitated with Monaquat P-TC (as in Example 1) dissolved directly in 60% isopropanol while the control (unreacted) xanthan gum did not. The xanthan derivative produced a viscosity of 600 cp at 60 rpm and 3400 cp at 6 rpm in 60% isopropanol when measured on a Brookfield LVT Viscometer using spindle #3.

What is claimed is:

1. A fully derivatized quaternary ammonium salt of an anionic gum, which is S-194 or S-130, wherein the quaternary ammonium compound contains a single alkyl or alkenyl substituent of 13–24 carbon atoms or two alkyl or alkenyl substituents of 12–24 carbon atoms per substituent, and the ethylene oxide substituted analogs thereof.

2. A salt of claim 1 wherein the gum is S-194.

3. A salt of claim 1 wherein the gum is S-130.

4. A viscous organic solvent composition comprising by weight:
    (a) 0.05–5.0% (wt) quaternary ammonium salt of xanthan gum, S-194, or S-130, wherein the quaternary ammonium compound contains a single alkyl or alkenyl substituent of 13–24 carbon atoms or two alkyl or alkenyl substituents of 12–24 carbon atoms per substituent, and the ethylene oxide substituted analogs thereof; and
    (b) a solvent which is one $C_1$–$C_3$ alkanol, N-methyl-2-pyrrolidone, ethylene glycol, or propylene glycol with the proviso that when the solvent is an alkanol other than methanol the solvent contains 10–20% (wt) water.

5. A composition of claim 4 comprising 60–80% methylene chloride and a solvent which is methanol or a methanol/water solution.

6. A viscous organic solvent composition comprising by weight:
    (a) 0.1–2% (wt) quaternary ammonium salt of xanthan gum, S-194, or S-130, wherein the quaternary ammonium compound contains a single alkyl or alkenyl substituent of 13–24 carbon atoms or two alkyl or alkenyl substituents of 12–24 carbon atoms per substituent, and the ethylene oxide substituted analogs thereof; and
    (b) a solvent which is propylene glycol or $C_2$–$C_3$ alkanol/water solution wherein the ratio alkanol/water is approximately 1.5:1.

7. A composition of claim 6 wherein the quaternary ammonium compound is tri(cocamidopropyldimethylpropyleneglycol ammonium chloride)phosphate.

* * * * *